US012781868B1

United States Patent

(12) United States Patent
Hall et al.

(10) Patent No.: US 12,781,868 B1
(45) Date of Patent: Nov. 3, 2026

(54) ELECTRONICALLY-CONTROLLED VARIABLE FLOW VALVES

(71) Applicant: GM GLOBAL TECHNOLOGY OPERATIONS LLC, Detroit, MI (US)

(72) Inventors: Devon Robert Hall, Ann Arbor, MI (US); Brian K. Saylor, South Lyon, MI (US); Matthew Watts, South Lyon, MI (US); McGregor Coyne, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/245,540

(22) Filed: Jun. 23, 2025

(51) Int. Cl.

| | |
|---|---|
| ***F16K 31/00*** | (2006.01) |
| ***B60G 11/26*** | (2006.01) |
| ***B60G 17/015*** | (2006.01) |
| ***B60G 17/052*** | (2006.01) |

(52) U.S. Cl.
CPC ............ *F16K 31/004* (2013.01); *B60G 11/26* (2013.01); *B60G 17/0155* (2013.01); *B60G 17/0528* (2013.01); *B60G 2202/152* (2013.01); *B60G 2202/424* (2013.01)

(58) Field of Classification Search
CPC ... F16K 31/004; B60G 11/26; B60G 17/0155; B60G 17/0528; B60G 2202/152; B60G 2202/424
USPC ...................................................... 280/124.16
See application file for complete search history.

(56) References Cited

U.S. PATENT DOCUMENTS

| | | | | |
|---|---|---|---|---|
| 4,531,539 | A | 7/1985 | Jandrasi et al. | |
| 5,322,321 | A | 6/1994 | Yopp | |
| 5,343,894 | A * | 9/1994 | Frisch | F15B 5/003 137/625.65 |
| 5,354,032 | A * | 10/1994 | Sims | F16K 31/005 251/129.06 |

(Continued)

FOREIGN PATENT DOCUMENTS

| | | | |
|---|---|---|---|
| CN | 119289119 | A | 1/2025 |
| DE | 3615432 | A1 | 11/1987 |

(Continued)

OTHER PUBLICATIONS

U.S. Appl. No. 19/175,205, filed Apr. 10, 2025, Hall et al..

(Continued)

*Primary Examiner* — Jason D Shanske
*Assistant Examiner* — Caitlin Anne Miller

(57) ABSTRACT

An electronically-controllable flow valve includes a conduit including a fluid channel with an inlet and an outlet. A projection is connected to an inner surface of the fluid channel. A piezoelectric diaphragm is arranged on an opposing surface of the conduit adjacent to the projection. A piezo actuator is configured to supply power across the piezoelectric diaphragm to vary an opening between the projection and the opposing surface of the fluid channel. The piezo actuator is configured to cause the piezoelectric diaphragm to move to a closed state against the projection to seal the fluid channel. A spring and/or a linear actuator are configured to bias an outer surface of the piezoelectric diaphragm towards the projection. An air suspension system includes air spring assemblies arranged at front and rear suspensions/wheel assemblies and a plurality of the electronically-controllable flow valves.

20 Claims, 13 Drawing Sheets

(56) References Cited

U.S. PATENT DOCUMENTS

| | | | | |
|---|---|---|---|---|
| 5,390,698 | A * | 2/1995 | Frazzini | F16K 15/025 137/496 |
| 5,466,007 | A * | 11/1995 | Smith | B60G 17/0155 280/5.514 |
| 6,189,858 | B1 * | 2/2001 | Miyazoe | F16K 31/004 251/129.06 |
| 6,276,710 | B1 | 8/2001 | Sutton | |
| 7,077,379 | B1 * | 7/2006 | Taylor | F16K 31/004 239/102.2 |
| 9,267,605 | B2 * | 2/2016 | Abatchev | H01L 21/30655 |
| 2016/0169180 | A1 * | 6/2016 | McAlister | F02M 61/08 239/584 |
| 2016/0272035 | A1 | 9/2016 | Oishi et al. | |
| 2016/0280034 | A1 | 9/2016 | Ogino et al. | |
| 2017/0349023 | A1 | 12/2017 | Mori | |
| 2017/0361672 | A1 | 12/2017 | Ahmadian | |
| 2018/0029432 | A1 | 2/2018 | Kondo et al. | |
| 2019/0084365 | A1 | 3/2019 | Oishi et al. | |
| 2019/0085841 | A1 | 3/2019 | Ito et al. | |
| 2020/0238782 | A1 | 7/2020 | Vaughan et al. | |
| 2020/0247210 | A1 | 8/2020 | Sirke et al. | |
| 2020/0298645 | A1 | 9/2020 | Hirao et al. | |
| 2020/0355296 | A1 * | 11/2020 | Shugrue | F16K 7/16 |
| 2021/0061040 | A1 | 3/2021 | Coombs et al. | |
| 2022/0055436 | A1 | 2/2022 | Kizu et al. | |

FOREIGN PATENT DOCUMENTS

| | | | |
|---|---|---|---|
| DE | 19534137 | A1 | 3/1997 |
| DE | 10048376 | A1 | 4/2002 |
| DE | 10330432 | A1 | 2/2005 |
| DE | 102019219880 | A1 | 6/2021 |
| DE | 102022133694 | A1 | 6/2024 |

OTHER PUBLICATIONS

German Office Action from counterpart DE1020251206937, dated Dec. 19, 2025.

German Office Action from counterpart DE1020251316155, dated Jul. 22, 2026.

* cited by examiner

ELECTRONICALLY-CONTROLLED VARIABLE FLOW VALVES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to variable flow valves, and more particularly to an electronically controlled variable flow valves.

Vehicles may include an air spring suspension system arranged between a frame of the vehicle and wheels of the vehicle. The air spring suspension system includes air spring assemblies. Typically, a solenoid valve block includes a single valve to control air pressure supplied to each air spring. The single solenoid valve block allows each of the air spring assemblies to be charged or discharged from a single air supply unit such as a compressor and/or a pressurized air tank.

SUMMARY

An electronically-controllable flow valve includes a conduit including a fluid channel with an inlet and an outlet. A projection is connected to an inner surface of the fluid channel. A piezoelectric diaphragm is arranged on an opposing surface of the conduit adjacent to the projection. A piezo actuator is configured to supply power across the piezoelectric diaphragm to vary an opening between the projection and the opposing surface of the fluid channel. The piezo actuator is configured to cause the piezoelectric diaphragm to move to a closed state against the projection to seal the fluid channel.

In other features, a spring is configured to bias an outer surface of the piezoelectric diaphragm towards the projection. A linear actuator is configured to bias an outer surface of the piezoelectric diaphragm.

In other features, the spring biases the piezoelectric diaphragm into the closed state when power is not supplied by the piezo actuator to the piezoelectric diaphragm. The piezoelectric diaphragm compresses the spring when the piezoelectric diaphragm is in an open state and power is supplied by the piezo actuator to the piezoelectric diaphragm.

A vehicle includes an air suspension system including air spring assemblies arranged at front and rear suspensions/wheel assemblies. A plurality of the electronically-controllable flow valve is configured to control fluid flow to the air spring assemblies.

An electronically-controllable flow valve includes a conduit including a fluid channel having a first side, a second side, and an opening between the first side and the second side. The first side is configured to receive pressurized fluid. A plate is reciprocally arranged in the opening and including a slit extending inwardly from one side thereof. An actuator is configured to move the plate in the opening to vary a position of the slit relative to the opening and a flow rate of fluid through the fluid channel.

In other features, the actuator is configured to position the plate in a non-overlapping slit position with the plate configured to prevent fluid flow through the fluid channel. The actuator is configured to move the plate to an overlapping slit position to enable fluid flow through the fluid channel.

In other features, the actuator is configured to move the plate to a non-overlapping position relative to the fluid channel to allow cleaning of the fluid channel. The slit has one of a triangular shape and opposing surfaces having a parabolic shape.

In other features, the actuator is selected from a group consisting of a linear actuator, a rotary actuator, and a cam lobe actuator. A shaft connects the actuator to the plate and a spring is arranged around the shaft between the actuator and the plate.

In other features, a housing surrounds the plate and a portion of the conduit including the opening.

A vehicle includes an air suspension system including air spring assemblies arranged at front and rear suspensions/wheel assemblies. A plurality of the electronically-controllable flow valve is configured to control fluid flow to the air spring assemblies.

An electronically-controllable flow valve includes a conduit including a fluid channel having a first side, a second side, and an opening between the first side and the second side. The first side is configured to receive pressurized fluid. A plate is reciprocally arranged in the opening and including a plurality of fixed orifices. An actuator is configured to move the plate in the opening to vary a position of the plurality of fixed orifices relative to the opening and adjust a flow rate of fluid through the fluid channel.

In other features, the actuator is configured to position the plate in a non-overlapping orifice position with the plate configured to prevent fluid flow through the fluid channel. The actuator is configured to move the plate to an overlapping orifice position with at least one of the plurality of fixed orifices overlapping the fluid channel to provide fluid flow through the fluid channel. The actuator is configured to move the plate to a non-overlapping position relative to the fluid channel to allow cleaning of the fluid channel.

In other features, the actuator is configured to move the plate to an overlapping orifice position with two or more of the plurality of fixed orifices overlapping the fluid channel to provide fluid flow through the fluid channel. The actuator is selected from a group consisting of a linear actuator, a rotary actuator, and a cam lobe actuator. A housing surrounds the plate and a portion of the conduit including the opening.

A vehicle includes an air suspension system including air spring assemblies arranged at front and rear suspensions/wheel assemblies. A plurality of the electronically-controllable flow valve is configured to control fluid flow to the air spring assemblies.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While electronically-controlled variable flow valves are described herein in the context of vehicles and air suspension systems, the electronically-controlled variable flow valves can be used in other applications.

The electronically-controlled variable flow valves according to the present disclosure provide precise flow control at lower cost. The electronically-controlled variable flow valves provide electro-mechanical flow control in areas where purely mechanical or pneumatic control is not feasible.

In some examples, the electronically-controlled variable flow valves are used in an air suspension system. The electronically-controlled variable flow valves enable accurate control of motion rates. There are known pinch/crush hazards associated with vehicle lowering. In some examples, a predetermined maximum movement rate is defined. Current air suspension systems stop and start motion multiple times during leveling events to keep the average lowering rate below the predetermined maximum movement rate.

The present disclosure allows the air suspension system to smoothly stay below the predetermined maximum movement rate. The electronically-controlled variable flow valves decrease the motion rate at the beginning and/or end of a leveling event to increase smoothness (e.g., reducing jerky movement).

Conventional air suspension systems are limited to a single fixed orifice size for front/rear concurrency. For most movements, the axles move at different speeds due to differences in front and rear spring pressure and/or volume. The electronically-controlled variable flow valves described herein allow each axle or wheel-end to move at the same speed for the entire height adjustment transition (as air spring/reservoir pressure and volume changes).

Figure 1:
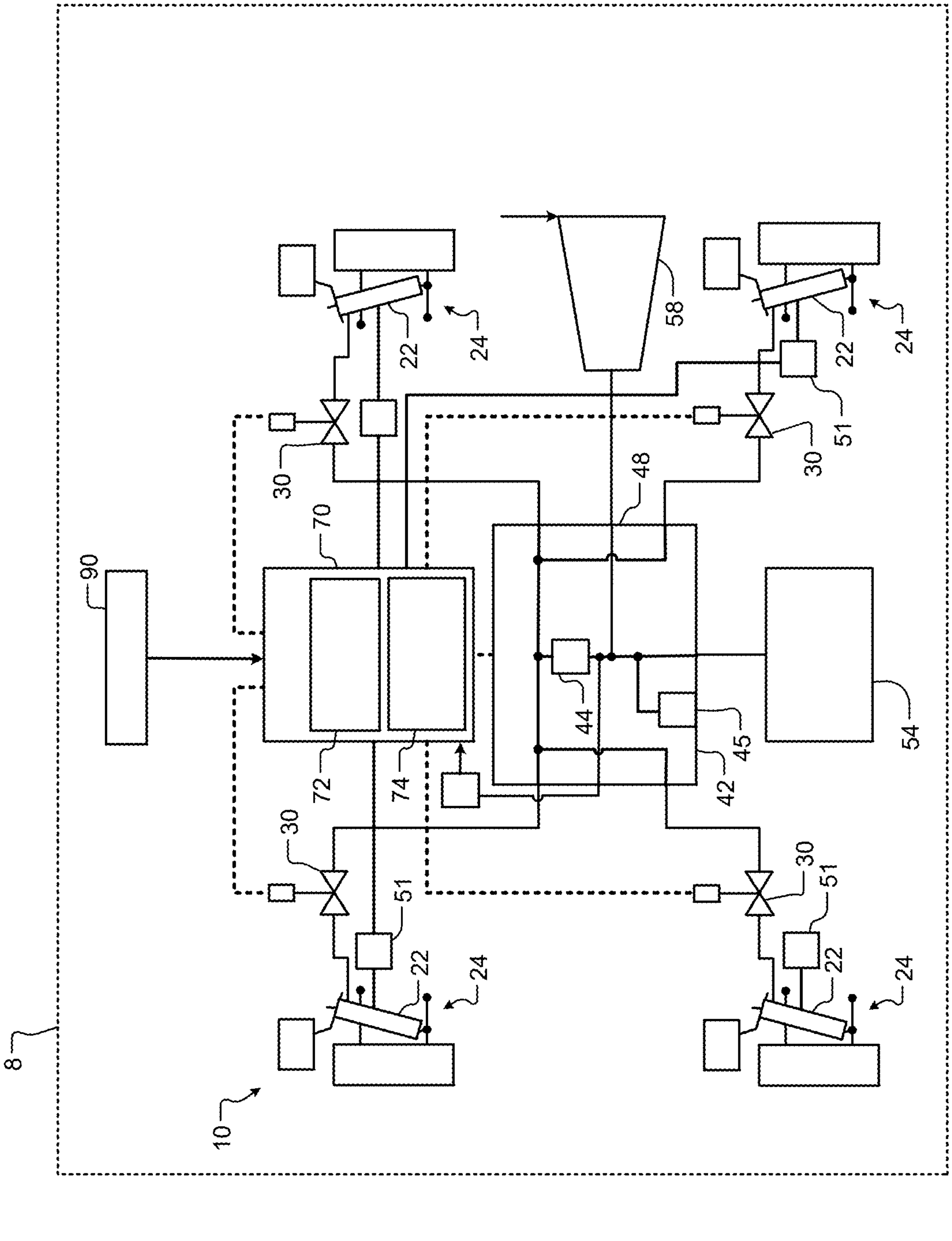
FIG. 1 is a functional block diagram of an example of an air suspension system including electronically-controlled variable flow valves according to the present disclosure.

Referring now to FIG. 1, an example of air spring suspension system is shown. Additional details of the air spring suspension system can be found in commonly-assigned U.S. patent application Ser. No. 19/175,205, filed on Apr. 10, 2025, and entitled "Air Spring Suspension System with Variable Flow Valves", which is hereby incorporated herein by reference in its entirety.

A vehicle 8 includes an air spring suspension system 10 including air spring assemblies 22 connecting a frame F of the vehicle 8 to front and rear suspensions/wheel assemblies 24 of the vehicle 8. In some examples, the air spring assemblies 22 include an air spring, an air spring surrounding a damper, a separate air spring and a damper, and/or other configurations. A solenoid valve block 42 is fluidly connected by variable flow valves 30 to the air spring assemblies 22 to allow more precise control thereof.

The solenoid valve block 42 includes one or more solenoid valves 44 that selectively supply pressurized air from a reservoir 54 and/or a compressor 58 to the variable flow valves 30. Various configurations of the solenoid valve block 42 can be used depending upon a desired level of control. For example in FIG. 1, a single one of the solenoid valves 44 supplies pressurized air to all of the variable flow valves 30. However, other variations of solenoid valves can be used. In other examples, four of the solenoid valves 44 individually supply the variable flow valves 30, respectively. In still other examples, two of the solenoid valves 44 supply two of the variable flow valves 30 (e.g., supplying front sets and rear sets of air spring assemblies, respectively).

In some examples, the variable flow valves 30 comprise a valve with a variable orifice and/or valves that are pulse width modulated (PWM) open and closed to vary air pressure supplied to the air spring assemblies 22. In some examples, a solenoid valve 45 may be used to release pressure in the solenoid valve block 42 when a pressure sensed by a pressure sensor P is greater than a predetermined pressure. In some examples, a solenoid valve 46 and/or another valve may be provided to selectively connect or disconnect the reservoir 54 and/or the compressor 58, respectively, from the solenoid valve block 42.

Height sensors 51 generate position signals representing a position of the air spring assemblies 22 which typically corresponds to the suspension height of the vehicle at the respective corners of the vehicle.

A controller 70 includes a suspension control module 72 configured to control the solenoid valves 44, 45, 46, and/or 48 in the solenoid valve block 42 and the variable flow valves 30 as will be described further below. The pressure sensor P senses pressure in the solenoid valve block 42. As can be appreciated, additional pressure sensors can sense pressure at other locations corresponding to each of the front and/or rear wheels. The controller 70 also includes a diagnostic module 74 described further below.

The controller 70 receives data from a vehicle kinematic sensor 90 configured to sense one or more vehicle kinematic parameters. In some examples, the vehicle kinematic sensor 90 includes an inertia measurement unit (IMU) configured to sense vehicle inertia. The vehicle inertia, vehicle weight, vehicle kinematic parameters (such as inertia, acceleration, braking, and other parameters) can be used to estimate pressure within the air spring assemblies. In other examples, the pressure sensor at the solenoid valve block can be used to measure pressure in the air spring by opening the corresponding variable air valve at each location sequentially while the others are closed and measuring pressure using the pressure sensor P.

Figure 2A:
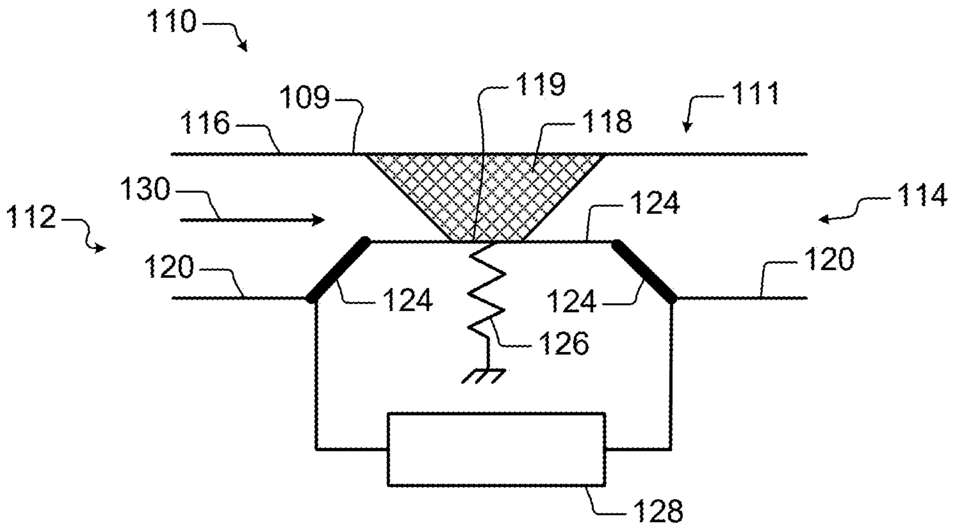
FIGS. 2A to 3B are side cross sections illustrating an example of an electronically-controlled variable flow valve including conduit with a fluid channel, a piezoelectric diaphragm, a piezo actuator, a linear actuator, and/or a spring according to the present disclosure.
Figure 2B:
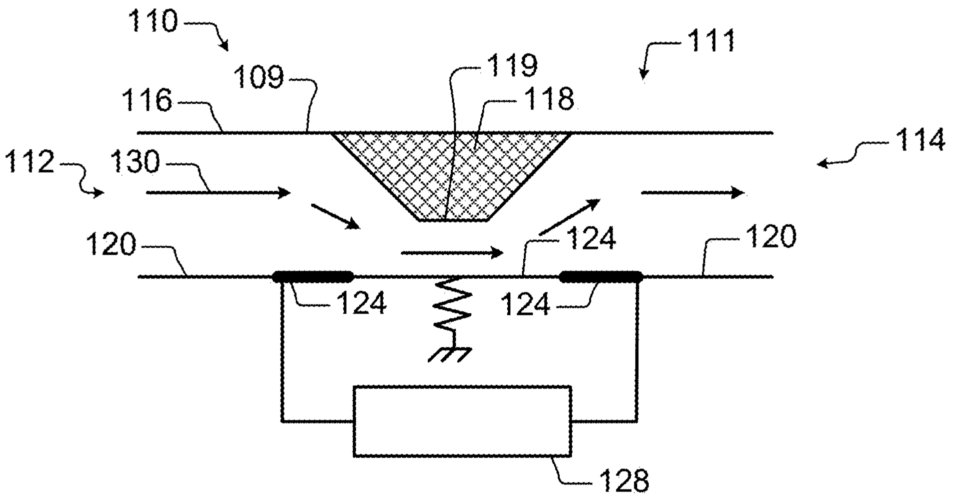

Referring now to FIGS. 2A and 2B, an electronically-controlled variable flow valve 110 includes conduit 109 defining a fluid channel 111 including an inlet 112 and an outlet 114. One surface 116 of the fluid channel 111 includes a projection 118. An opposite surface 120 of the fluid channel 111 includes a piezoelectric diaphragm 124. In some examples, the projection 118 includes a planar portion 119 generally aligned with the opposite surface 120 of the fluid channel 111, although other shapes can be used.

In some examples, a spring 126 biases an outer surface of the piezoelectric diaphragm 124 into a closed position. A piezo actuator 128 selectively supplies voltage and/or current across the piezoelectric diaphragm 124 causing the piezoelectric diaphragm 124 to close. In FIG. 2, the spring 126 biases the diaphragm of the piezoelectric diaphragm 124 against the projection 118 to seal the fluid channel 111. In FIG. 3, the piezo actuator 128 biases the piezoelectric diaphragm 124 downwardly against the spring 126 into an open position. As can be appreciated, the electronically-controlled variable flow valve 110 can be normally open or normally closed. The displacement of the piezoelectric diaphragm 124 varies with the magnitude of the applied current or voltage.

Figure 3A:
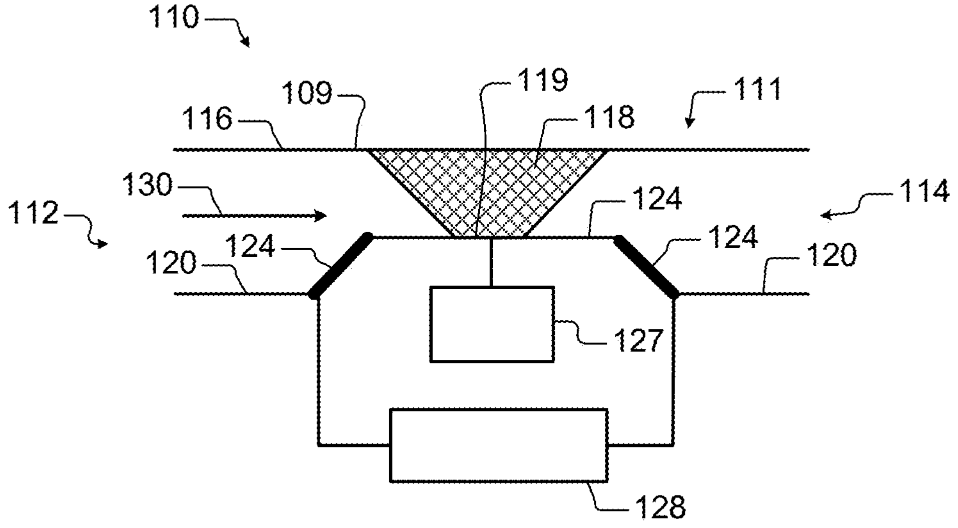
Figure 3B:
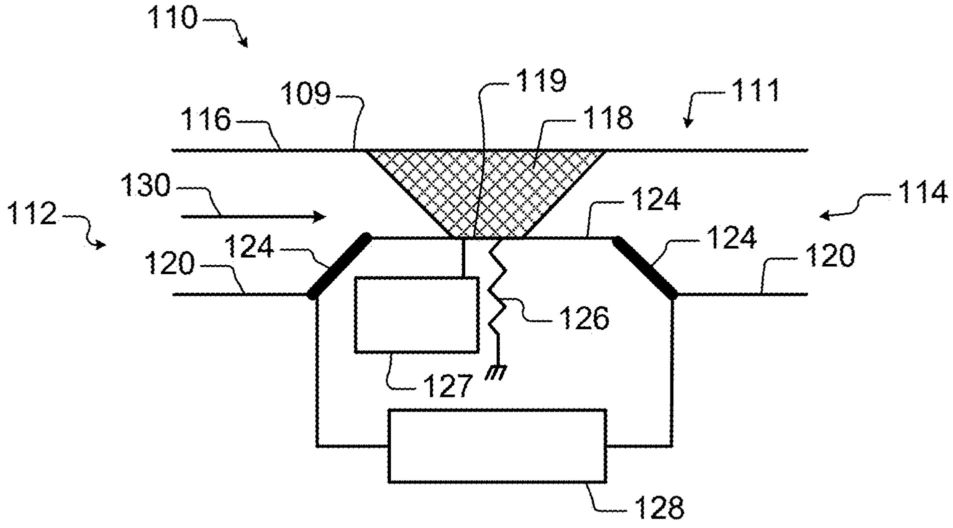

In FIG. 3A, the spring 126 is replaced by a linear actuator 127. In FIG. 3B, the linear actuator 127 is arranged in parallel with the spring 126. The linear actuator 127 provides coarse diaphragm movement while the piezo elements of the piezoelectric diaphragm 124 provide fine control of the shape of the piezoelectric diaphragm 124.

Figure 4A:
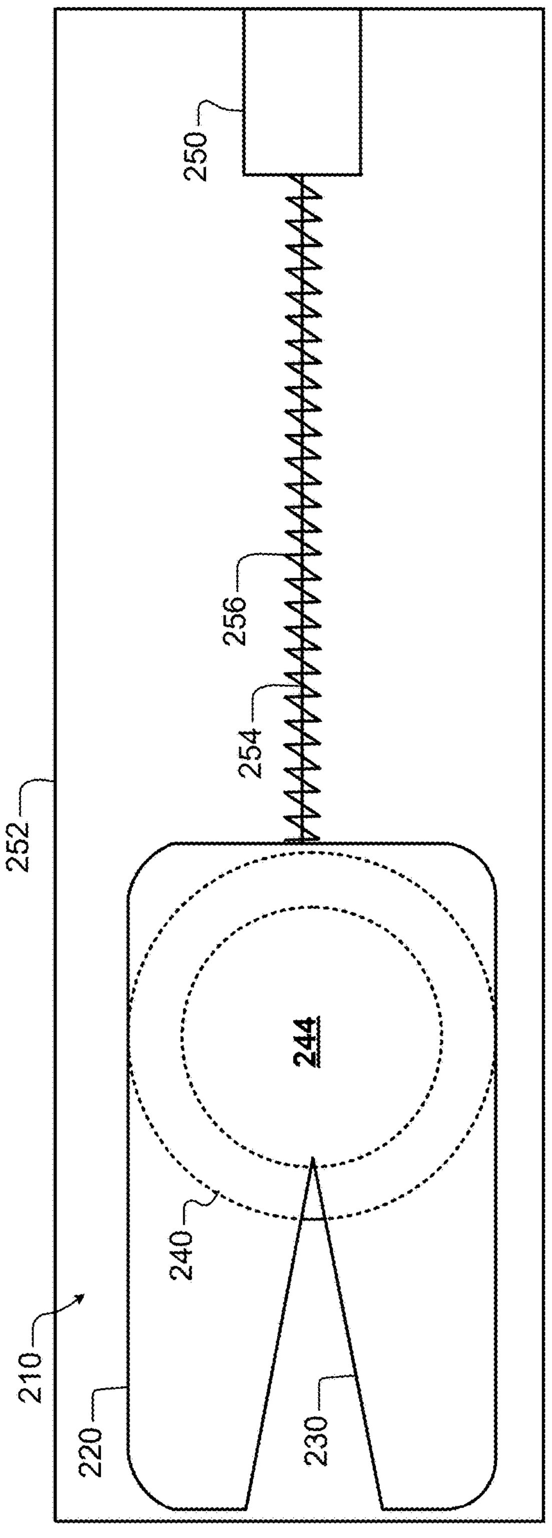
FIGS. 4A to 4D are side cross sections or side views illustrating an example of an electronically-controlled variable flow valve including a plate including a slit and arranged between opposite sides of conduit including a fluid channel, an actuator, and a spring according to the present disclosure.
Figure 4B:
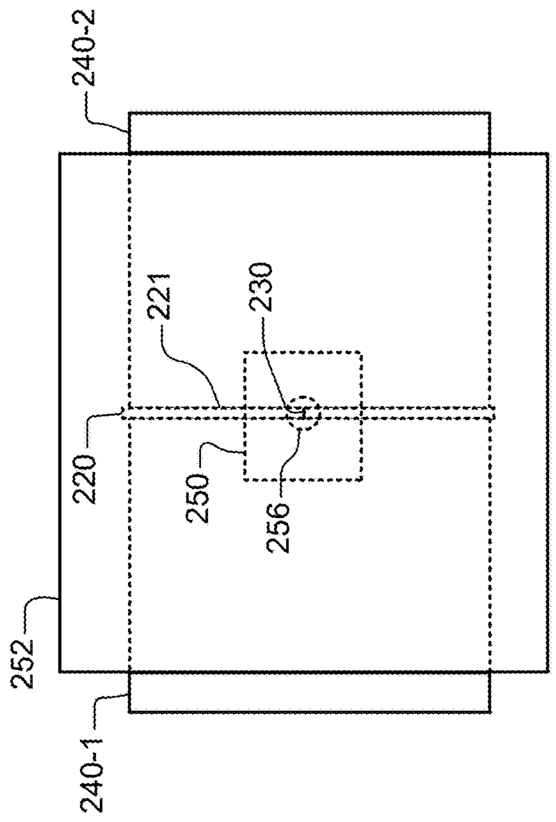

Referring now to FIGS. 4A and 4B, an electronically-controlled variable flow valve 210 includes a plate 220 and a conduit 240 including a first side 240-1 and a second side 240-2. Fluid passes through a fluid channel 244 of the conduit 240. The plate 220 moves in an opening 221 located between the opposite sides 240-1 and 240-2 of the conduit 240. In some examples, the opening 221 is arranged transverse to a flow direction in the fluid channel 244. The plate 220 includes a slit 230 extending inwardly from one side thereof. In this example, the slit 230 has a triangular shape. In other words, opposing sides of the slit 230 are angled inwardly and intersect.

An actuator 250 includes a shaft 254 connected to the plate 220. In some examples, a spring 256 is arranged around the shaft 254 to bias the plate 220 into a closed position. In some examples, one or both sides of the plate 220 and/or the opening 221 are lubricated to allow the plate 220 to slide in the opening 221. In other examples, interference between one or both sides of the plate 220 and/or the opening 221 provides a seal. In some examples, the electronically-controlled variable flow valve 210 is located in a housing 252. In some examples, the housing 252 forms a seal around the electronically-controlled variable flow valve 210.

Figure 4C:
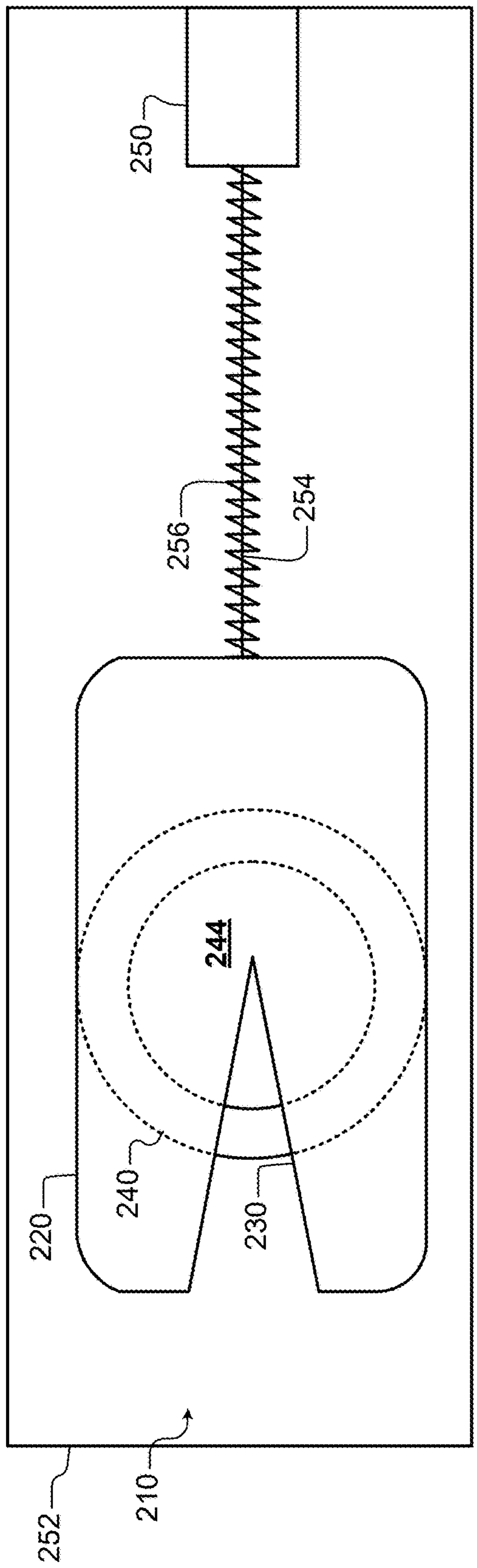
Figure 4D:
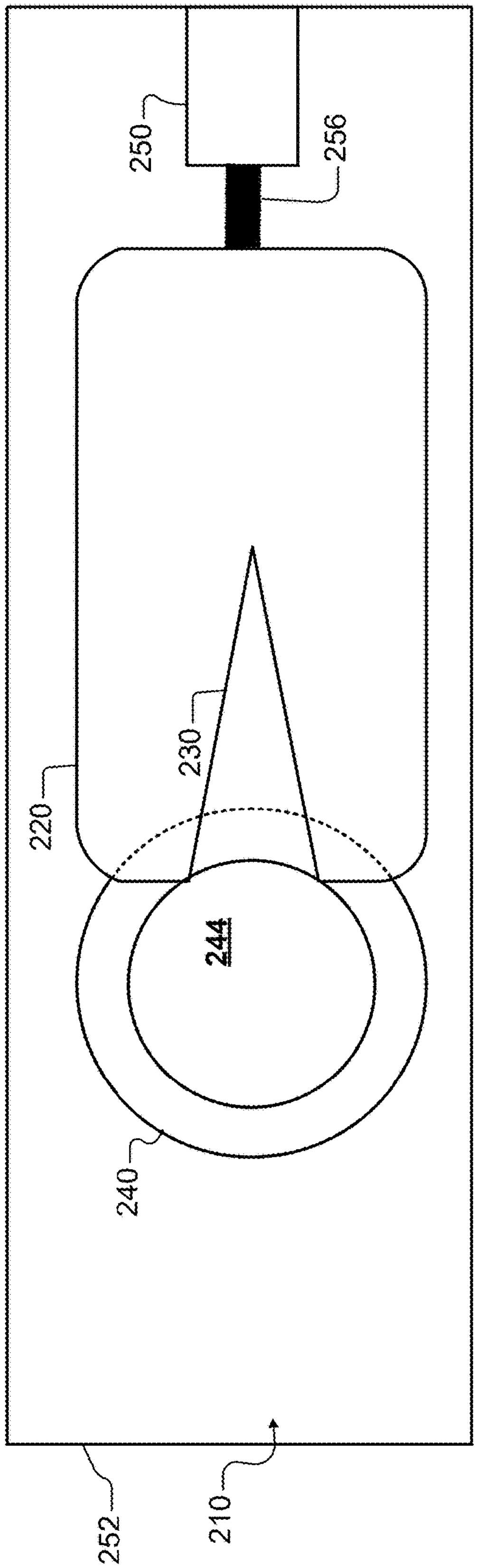

Referring now to FIGS. 4A, 4C, and 4D, the actuator 250 moves the plate 220 between various positions to vary fluid flow. In FIG. 4A, the actuator 250 can move the plate 220 to a fully closed position. In FIG. 4C, the actuator 250 moves the plate 220 to positions between fully closed and fully opened. The displacement of the plate 220 increases the orifice size. In FIG. 4D, the actuator 250 moves the plate 220 to a fully opened position for cleaning.

Figure 5A:
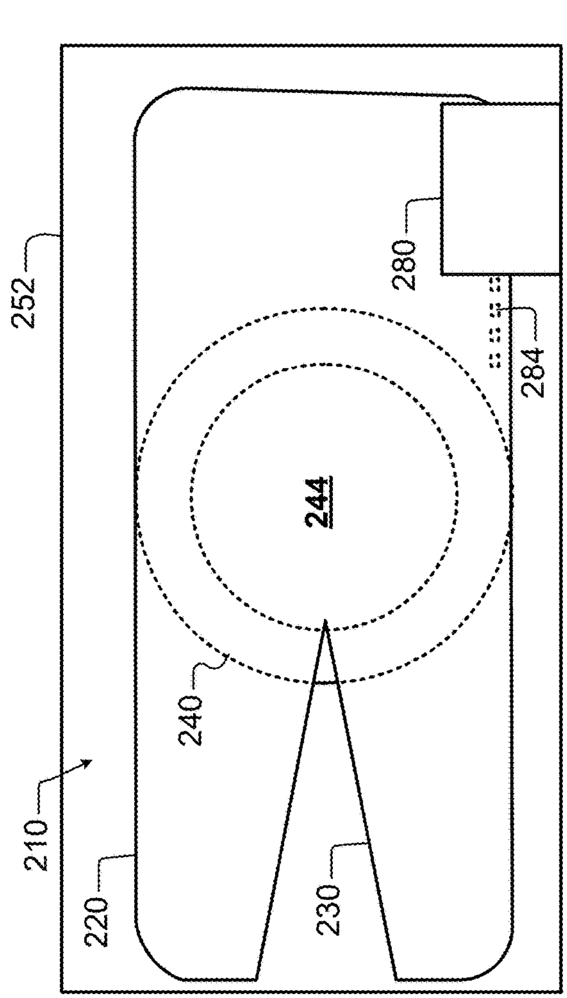
FIGS. 5A and 5B are a side cross section and side view illustrating an example of an electronically-controlled variable flow valve including a plate including a slit and arranged between opposite sides of conduit including a fluid channel, a rotary actuator, and a spring according to the present disclosure.
Figure 5B:
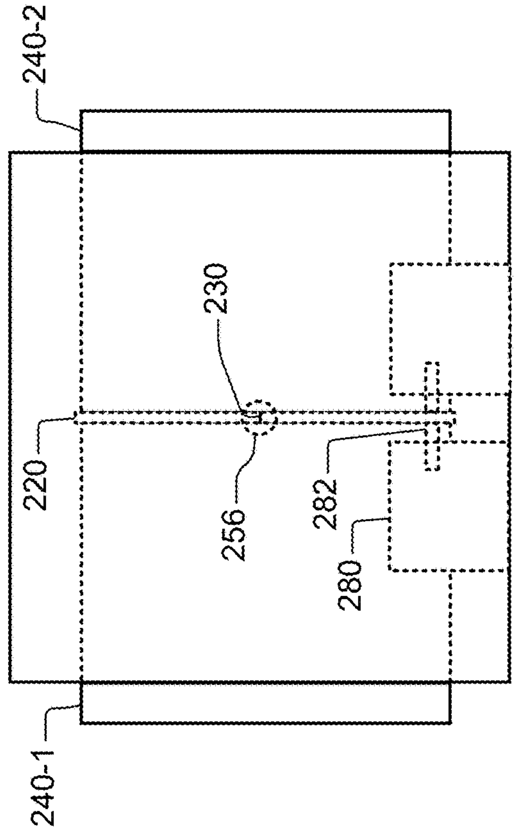

Referring now to FIG. 5A, the actuator 250 in the preceding examples is a linear actuator. However, other types of actuators can be used. In FIG. 5A, a rotary actuator 280 including a driver 282, such as a gear, cam, and/or wheel, is arranged on one or both sides of the plate 220. In some examples, the plate 220 includes spaced openings 284 that engage gears or cams of the driver 282. In other examples, the wheels engage outer surfaces of the plate 220.

Figure 6:
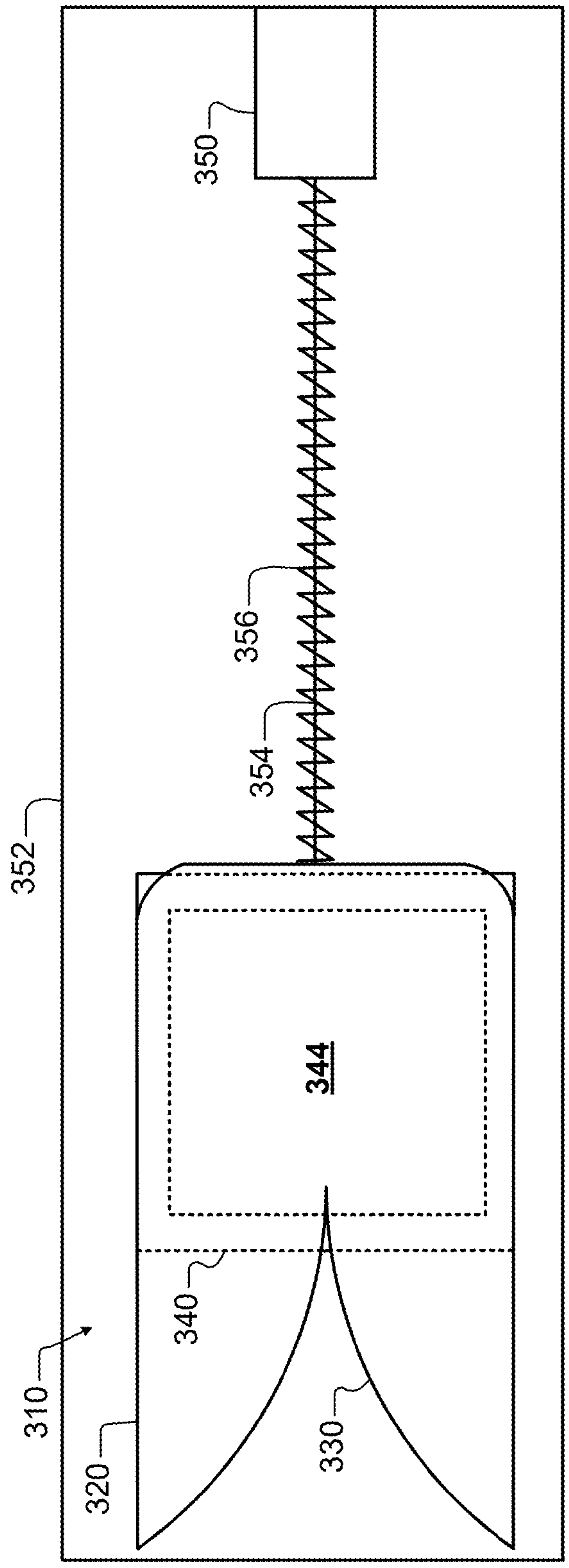
FIG. 6 is a side cross section illustrating an example of an electronically-controlled variable flow valve including a plate including a parabolic slit and arranged between opposite sides of conduit including a fluid channel, an actuator, and a spring according to the present disclosure.

Referring now to FIG. 6, an electronically-controlled variable flow valve 310 includes a plate 320 that is moved in an opening between opposite sides 340-1 and 340-2 of a conduit 344. The plate 320 includes a slit 330 extending inwardly from one side thereof. In this example, the slit 330 has a parabolic shape. In other words, opposing surfaces of the slit 330 are parabolic and intersect. The parabolic surfaces can be concave or convex.

An actuator 350 includes a shaft 354 connected to the plate 320. In some examples, a spring 356 is arranged around the shaft 354 to bias the plate 320 into a closed position. In some examples, one or both sides of the plate 320 and/or the opening 321 are lubricated to allow the plate 320 to slide in the opening 321. In some examples, the electronically-controlled variable flow valve 310 is located in a housing 352. In some examples, the housing 352 forms a seal around the electronically-controlled variable flow valve 310.

Figure 7:
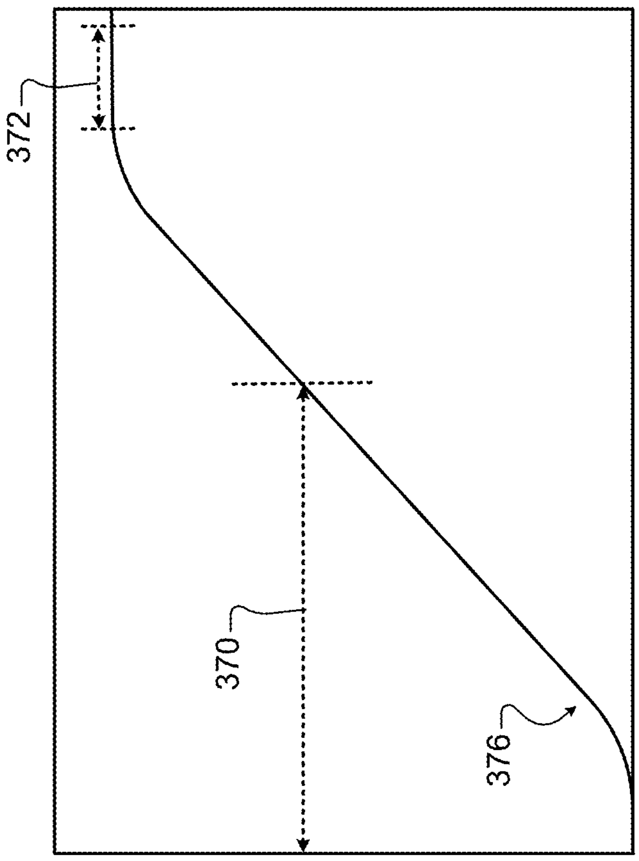
FIG. 7 is a graph illustrating an example of orifice area as a function of displacement for the plate including the parabolic opening and a rectangular conduit according to the present disclosure.

Referring now to FIG. 7, orifice area is shown as a function of displacement for the plate including the parabolic opening. The orifice area changes continuously as the displacement changes. A normal displacement range is shown at 370. At 372 a cleaning range is shown. The plate is typically moved in the normal displacement range when varying fluid flow. At 376, the orifice area as a function of displacement is highly controllable when initially opening the valve to allow fine air control.

Referring now to FIGS. 8A to 8E, an electronically-controlled variable flow valve 410 includes a plate 420 that is moved between opposite sides 440 of a fluid channel 444. The plate 420 includes a plurality of orifices 430-1, 430-2, . . . , and 430-N. While N=3 is shown, the plate 420 can include additional or fewer orifices. While the orifices are shown as rectangular, other shapes can be used. While a linear actuator is shown, other actuators can be used.

An actuator 450 includes a shaft 454 connected to the plate 420. In some examples, a spring 456 is arranged around the shaft 454 to bias the plate 420 into a closed position. In some examples, one or both sides of the plate 420 and/or the opening are lubricated to allow the plate 420 to slide in the opening. In some examples, the electronically-controlled variable flow valve 410 is located in a housing 452. In some examples, housing similar to those shown above forms a seal around the electronically-controlled variable flow valve 410.

Figure 8A:
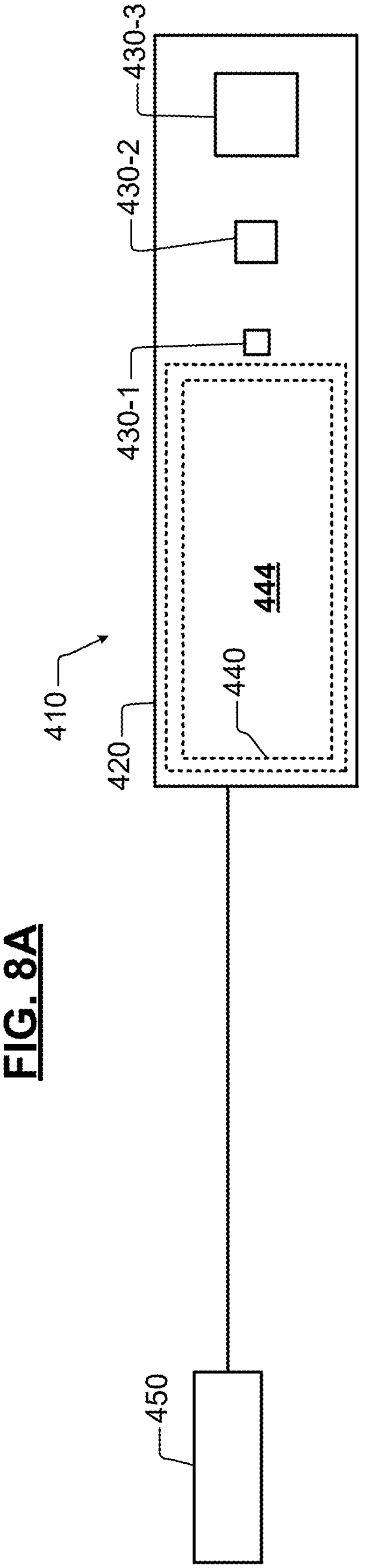
FIGS. 8A to 8E are a side cross sections illustrating an example of an electronically-controlled variable flow valve including a plate including spaced orifices and arranged between opposite sides of a conduit including a fluid channel, an actuator, and a spring according to the present disclosure.
Figure 8B:
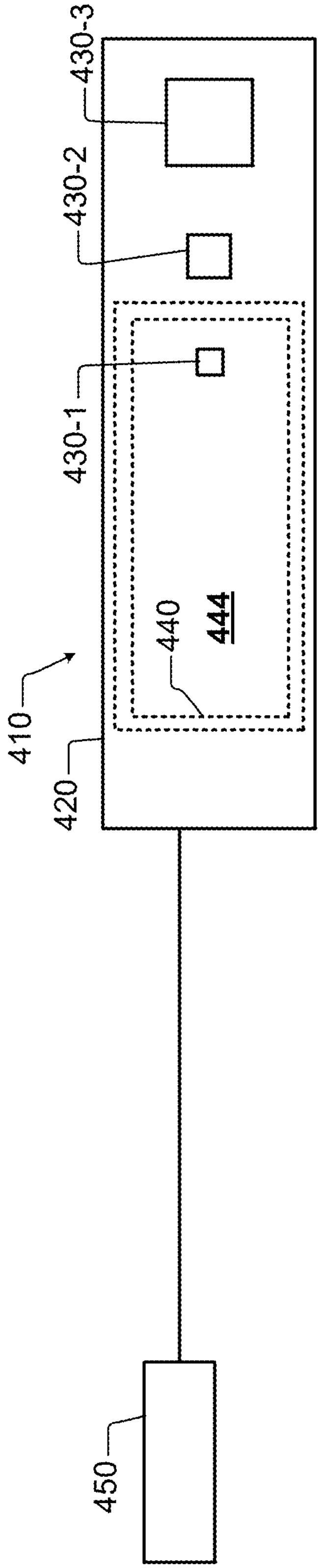
Figures 8C, 8D, 8E:
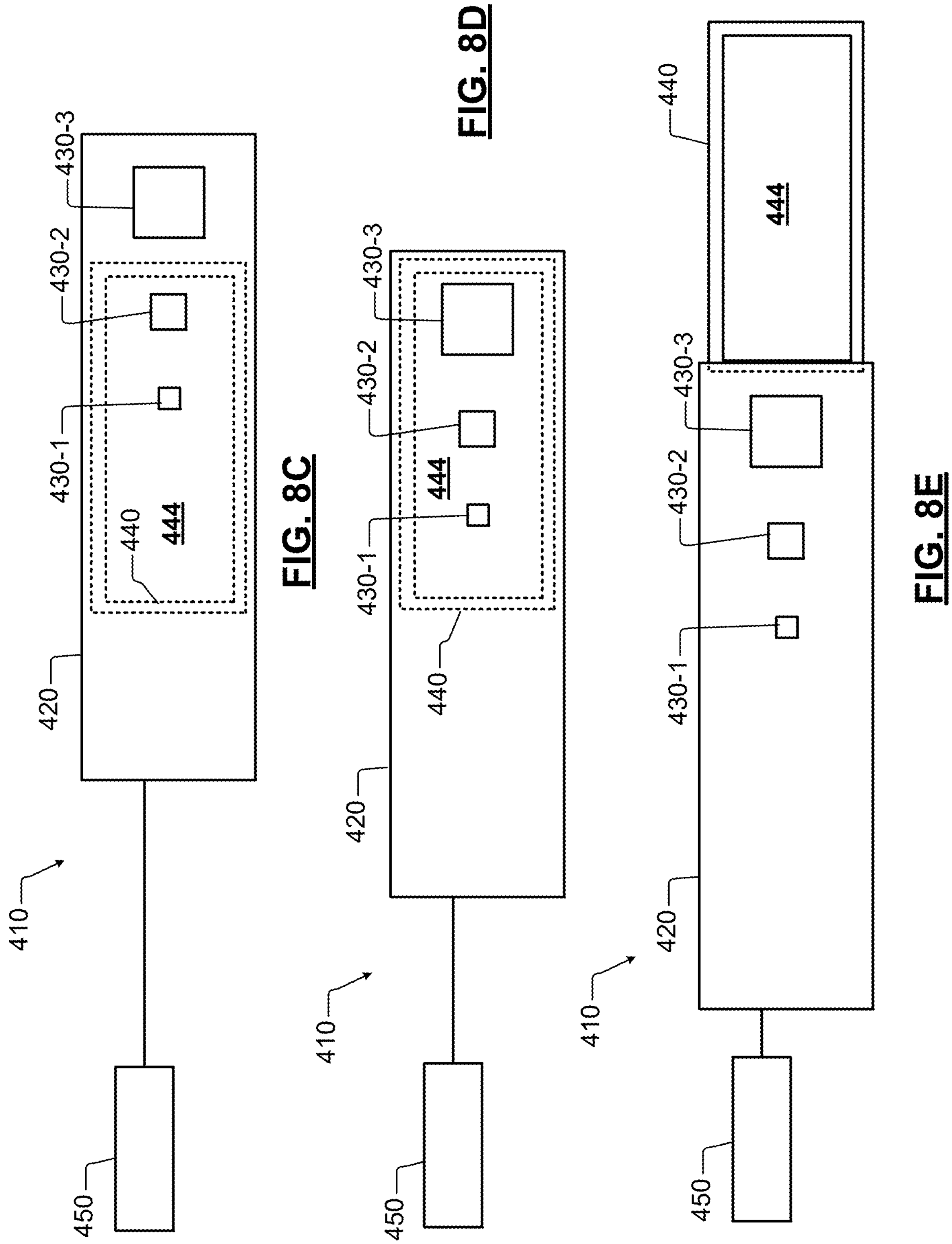

In FIG. 8A, the plate 430 blocks the fluid channel 444 since none of the orifices 430-1, 430-2, . . . are aligned with the fluid channel 444. In FIG. 8B, the actuator 450 moves the plate 420 so that one of the orifices (orifice 430-1) is aligned with the fluid channel 444. In FIG. 8C, the actuator 450 moves the plate 420 so that two of the orifices (orifices 430-1 and 430-2) are aligned with the fluid channel 444. In FIG. 8D, the actuator 450 moves the plate 420 so that three of the orifices (orifices 430-1, 430-2, and 430-3) are aligned with the fluid channel 444. In FIG. 8E, the actuator 450 moves the plate 420 to a cleaning position where the plate does not obstruct the fluid channel 444.

Figure 9:
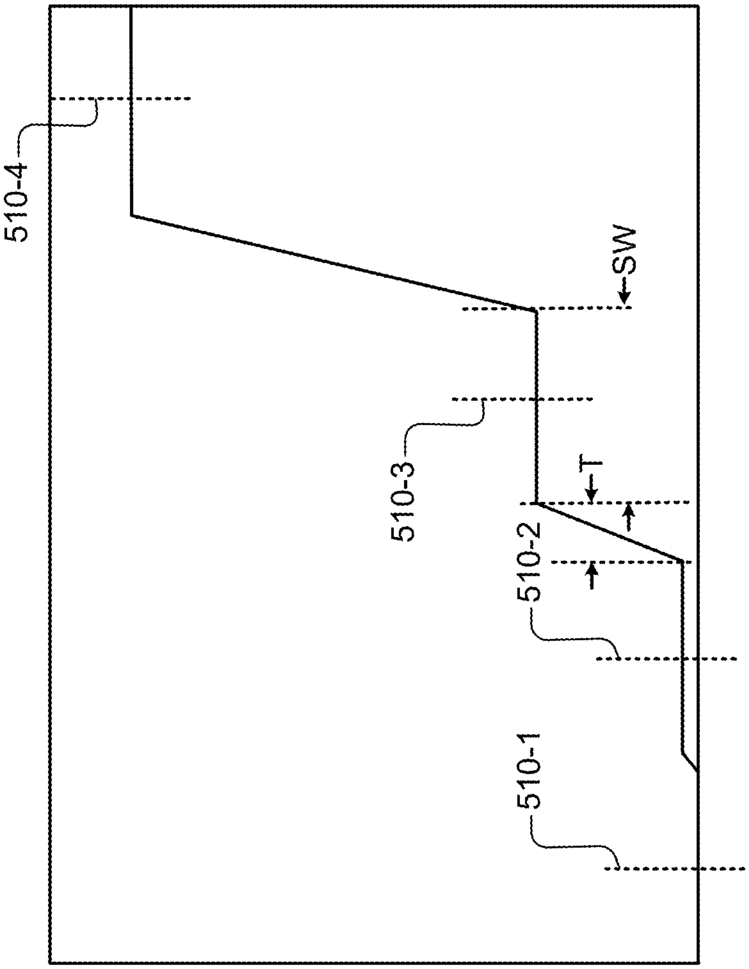
FIG. 9 is a graph illustrating an example of orifice area as a function of displacement for the plate including the spaced orifices according to the present disclosure.

Referring now to FIG. 9, orifice area is shown as a function of displacement for the plate including the plurality of orifices. In some examples, the actuator 450 moves the plate 420 to discrete positions 510-1, 510-2, and 520-3 (while missing transition regions T when the orifices partially cover an edge of the fluid channel) to provide predetermined and repeatable flow rates. In other words, the switching regions SW of the displacement provide different discrete flow rates and are large areas enabling precise control of fluid flow using an actuator with coarse movement. In other words, less expensive motion control can be used. Since the orifices are spaced, the accuracy of the actuator does not need to be high and consistent and uniform flow rates can be achieved.

Figure 10A:
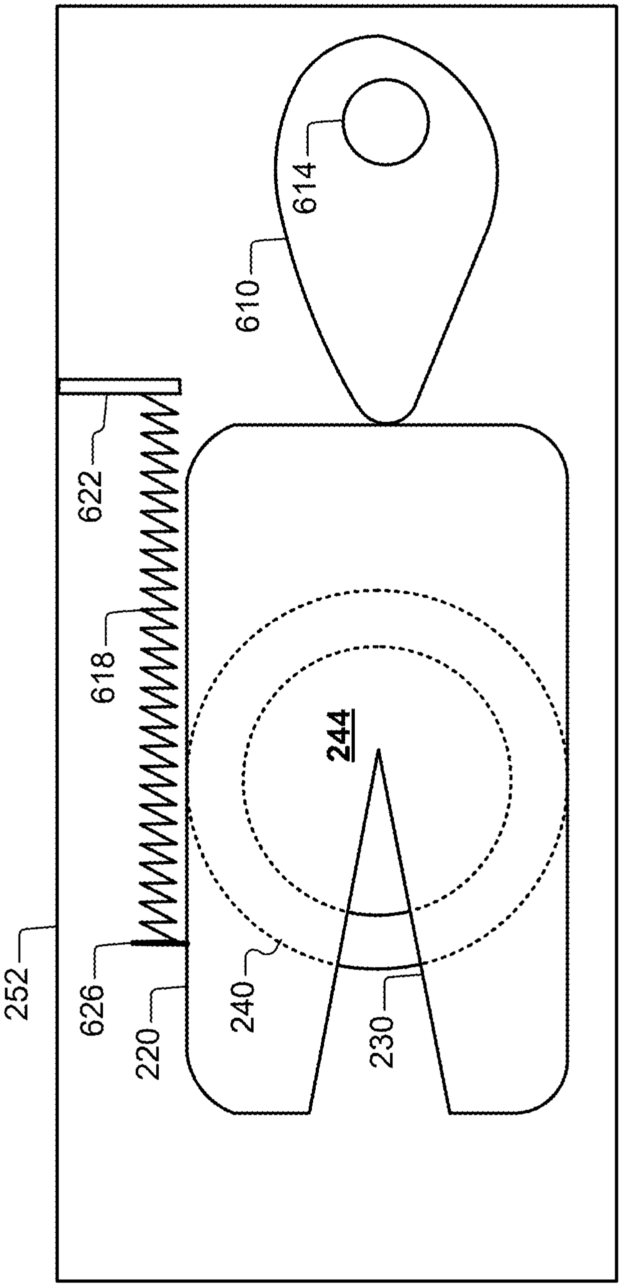
FIGS. 10A and 10B are side cross sections illustrating an example of an electronically-controlled variable flow valve including a plate including a slit and arranged between opposite sides of a fluid channel, a cam lobe actuator, and a spring according to the present disclosure.
Figure 10B:
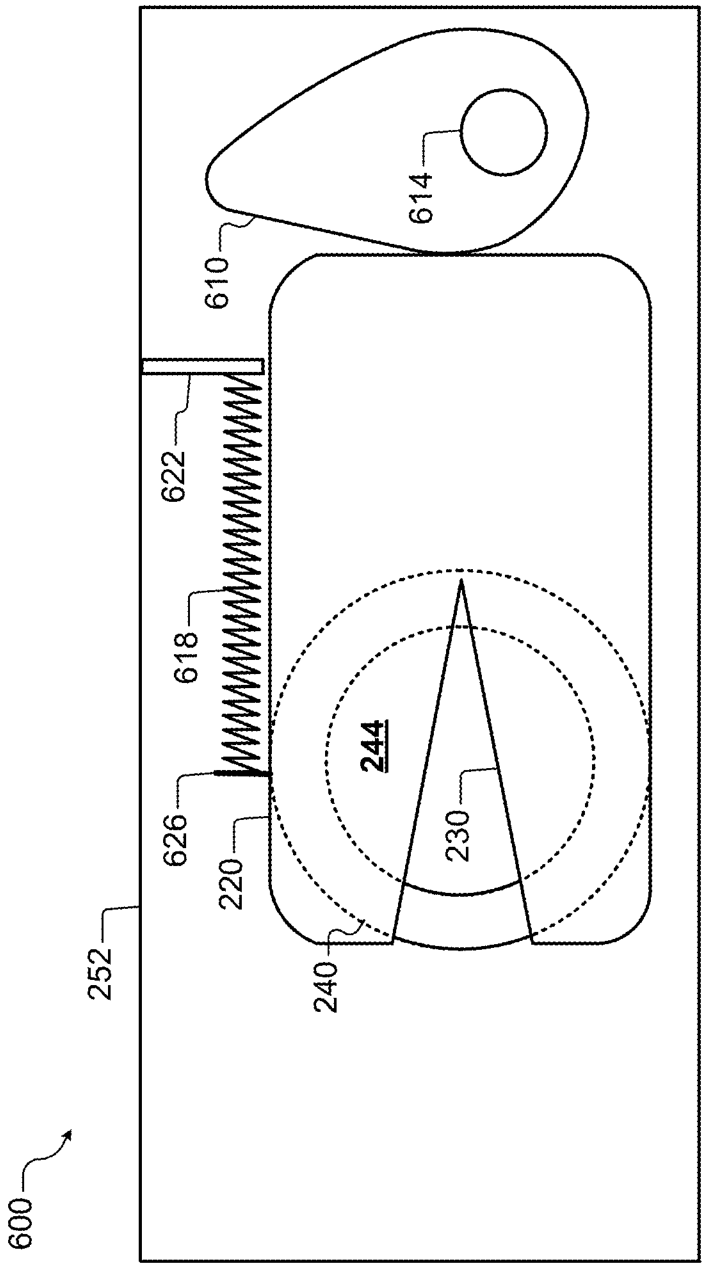

Referring now to FIGS. 10A and 10B, an electronically-controlled flow valve 600 includes a plate 220 that is biased by a cam lobe 610 or an actuator 614. A spring 618 is connected at 626 to the plate 220 and to the housing or another object at 622. As the actuator 614 rotates the cam lobe 610, the plate 220 is displaced and the size of the orifice opening changes. The spring 618 is compressed when the plate 220 is opened to bias the plate 220 against the cam lobe 610.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An electronically-controllable flow valve, comprising:

a conduit including a fluid channel with an inlet and an outlet;

a projection connected to an inner surface of the fluid channel;

a piezoelectric diaphragm arranged on an opposing surface of the conduit adjacent to the projection;

a piezo actuator configured to supply power across the piezoelectric diaphragm to vary an opening between the projection and the opposing surface of the fluid channel, wherein the piezo actuator is configured to cause the piezoelectric diaphragm to move to a closed state against the projection to seal the fluid channel;

a spring configured to bias an outer surface of the piezoelectric diaphragm towards the projection; and a linear actuator configured to bias an outer surface of the piezoelectric diaphragm.

2. The electronically-controllable flow valve of claim 1, wherein:

the spring biases the piezoelectric diaphragm into the closed state when power is not supplied by the piezo actuator to the piezoelectric diaphragm; and the piezoelectric diaphragm compresses the spring when the piezoelectric diaphragm is in an open state and power is supplied by the piezo actuator to the piezoelectric diaphragm.

3. A vehicle comprising:

an air suspension system including air spring assemblies arranged at front and rear suspensions/wheel assemblies; and a plurality of the electronically-controllable flow valve of claim 2 configured to control fluid flow to the air spring assemblies.

4. A vehicle comprising:

an air suspension system including air spring assemblies arranged at front and rear suspensions/wheel assemblies; and a plurality of the electronically-controllable flow valve of claim 1 configured to control fluid flow to the air spring assemblies.

5. An electronically-controllable flow valve comprising:

a conduit including a fluid channel having a first side, a second side, and an opening between the first side and the second side, wherein the first side is configured to receive pressurized fluid;

a plate reciprocally arranged in the opening and including a slit extending inwardly from one side of the plate, wherein the slit includes an open end to the one side of the plate, a closed end opposite to the open end, and opposing surfaces extending inwardly from the open end and intersecting at a vertex at the closed end; and an electronically-controllable actuator configured to move the plate in the opening to vary a position of the slit relative to the opening and a flow rate of fluid through the fluid channel.

6. The electronically-controllable flow valve of claim 5, wherein:

the electronically-controllable actuator is configured to position the plate in a non-overlapping slit position with the plate configured to prevent fluid flow through the fluid channel; and the electronically-controllable actuator is configured to move the plate to an overlapping slit position to enable fluid flow through the fluid channel.

7. The electronically-controllable flow valve of claim 5, wherein the electronically-controllable actuator is configured to move the plate to a non-overlapping position relative to the fluid channel to allow cleaning of the fluid channel.

8. The electronically-controllable flow valve of claim 5, wherein the slit has one of:

a triangular shape; and opposing surfaces having a parabolic shape.

9. The electronically-controllable flow valve of claim 5, wherein the electronically-controllable actuator is selected from a group consisting of a linear actuator, a rotary actuator, and a cam lobe actuator.

10. The electronically-controllable flow valve of claim 5, further comprising a shaft connecting the electronically-controllable actuator to the plate and a spring arranged around the shaft between the actuator and the plate.

11. The electronically-controllable flow valve of claim 5, further comprising a housing surrounding the plate and a portion of the conduit including the opening.

12. The electronically-controllable flow valve of claim 5, wherein the plate has a rectangular shape and the opposing surfaces of the slit are angled inwardly toward the vertex to provide a triangular shape.

13. The electronically-controllable flow valve of claim 5, wherein the plate has a rectangular shape and the opposing surfaces of the slit are angled inwardly toward the vertex and parabolically shaped.

14. An electronically-controllable flow valve comprising:

a conduit including a fluid channel having a first side, a second side, and an opening between the first side and the second side, wherein the first side is configured to receive pressurized fluid;

a plate reciprocally arranged in the opening and including a plurality of fixed orifices spaced apart from each other, wherein each fixed orifice of the plurality of fixed orifices has a different cross-sectional area relative to each other of the plurality of fixed orifices; and an electronically-controllable actuator configured to move the plate in the opening to vary a position of the plurality of fixed orifices relative to the opening and adjust a flow rate of fluid through the fluid channel.

15. The electronically-controllable flow valve of claim 14, wherein:

the electronically-controllable actuator is configured to position the plate in a non-overlapping orifice position with the plate configured to prevent fluid flow through the fluid channel, the electronically-controllable actuator is configured to move the plate to an overlapping orifice position with at least one of the plurality of fixed orifices overlapping the fluid channel to provide fluid flow through the fluid channel, and the electronically-controllable actuator is configured to move the plate to a non-overlapping position relative to the fluid channel to allow cleaning of the fluid channel.

16. The electronically-controllable flow valve of claim 15, wherein the electronically-controllable actuator is configured to move the plate to an overlapping orifice position with two or more of the plurality of fixed orifices overlapping the fluid channel to provide fluid flow through the fluid channel.

17. The electronically-controllable flow valve of claim 14, wherein the electronically-controllable actuator is selected from a group consisting of a linear actuator, a rotary actuator, and a cam lobe actuator.

18. The electronically-controllable flow valve of claim 14, further comprising a housing surrounding the plate and a portion of the conduit including the opening.

19. A vehicle comprising:

an air suspension system including air spring assemblies arranged at front and rear suspensions/wheel assemblies; and a plurality of the electronically-controllable flow valve of claim 14 configured to control fluid flow to the air spring assemblies.

20. The electronically-controllable flow valve of claim 14, wherein the plate has a rectangular shape and the different cross-sectional areas of the plurality of fixed orifices each monotonically increase from one end to an opposite end of the plate.

* * * * *